(12) United States Patent
Katz (10) Patent No.: US 7,564,404 B2
(45) Date of Patent: Jul. 21, 2009

(54) DETERMINING PRECISE DIRECTION AND DISTANCE TO A SATELLITE RADIO BEACON

(75) Inventor: Daniel A. Katz, 87 Tzahal st., Kiryat-Ono (IL) 55451

(73) Assignee: Daniel A. Katz, Kiryat-Ono (IL)

( * ) Notice: Subject to any disclaimer, the term of this patent is extended or adjusted under 35 U.S.C. 154(b) by 0 days.

(21) Appl. No.: 11/836,783

(22) Filed: Aug. 10, 2007

(65) Prior Publication Data

US 2009/0040108 A1    Feb. 12, 2009

(51) Int. Cl.
*G01S 1/08*    (2006.01)
*G01S 5/14*    (2006.01)
(52) U.S. Cl. .................. 342/357.08; 342/386; 342/458
(58) Field of Classification Search ............ 342/357.02, 342/357.08, 357.12, 458, 459, 385, 386; 701/213, 214
See application file for complete search history.

(56) References Cited

U.S. PATENT DOCUMENTS

| 5,497,149 A | * | 3/1996 | Fast ........................... 340/988 |
| 2002/0021621 A1 | * | 2/2002 | Haase et al. ................ 367/118 |
| 2005/0212672 A1 | * | 9/2005 | Fry ....................... 340/539.13 |

* cited by examiner

*Primary Examiner*—Dao L Phan (57) ABSTRACT

The present invention discloses a device and method for precisely determining the direction and distance to a satellite radio beacon. In one embodiment, the disclosed device is used for SAR (search and rescue) of people in distress, upon activation of an emergency radio beacon, such as a marine EPIRB (Emergency Position Indicating Radio Beacon) or an airborne ELT (Emergency Locator Transmitter) or a terrestrial PLB (Personal Location Beacon) or a marine SSAS (Ship Security Alert System) beacon, beacons which are part of the Cospas-Sarsat system.

15 Claims, 3 Drawing Sheets block diagram of a device for precisely determining the direction and distance to a satellite radio beacon

Figure 1 - Overview of a device for precisely determining the direction and distance to a satellite radio beacon in the environment of Cospas-Sarsat and GPS satellites

Figure 2 - block diagram of a device for precisely determining the direction and distance to a satellite radio beacon

Figure 3 – Spherical model for precisely determining the direction and distance to a satellite radio beacon

DETERMINING PRECISE DIRECTION AND DISTANCE TO A SATELLITE RADIO BEACON

BACKGROUND OF THE INVENTION

Emergency radio beacons, especially those detectable by satellites, can be instrumental for search and rescue of people in distances, anywhere and anytime.

The use of satellites to detect and locate special-purpose radio beacons either manually activated or automatically activated upon aircraft crash or ship wreck, reduces the time required to alert the appropriate authorities and to accurately locate the distress site by the rescue team. The International Maritime Organization (IMO) and the International Civil Aviation Organization (ICAO) recommend that ships and aircraft carry Emergency Position Indicating Radio Beacons (EPIRBs) and Emergency Locator Transmitters (ELTs) respectively. Recently, small size Personal Locator Beacons (PLBs) are getting more and more popular for terrestrial use, by hikers, skiers, hunters, travelers, etc', as well as mariners and seafarers that might be in danger of Man Over Board (MOB) or other marine dangers.

A particular and important case of emergency radio beacons with a compatible constellation of satellites is the Cospas-Sarsat system. The current invention is particularly applicable to Cospas-Sarsat however reference to Cospas-Sarsat herein is intended to encompass any similar system, currently operating or to be deployed in the future.

Cospas-Sarsat is a satellite system designed to provide distress alert and location data to assist search and rescue (SAR) operations, using spacecraft and ground facilities to detect and locate the signals of distress radio beacons operating on 406 MHz (presently also 121.5 MHz however phasing out in a few years). The position of the distress and other related information is forwarded to the appropriate Search and Rescue Point of Contact (SPOC) through the Cospas-Sarsat Mission Control Center (MCC) network. The goal of the System is to support all organizations in the world with responsibility for SAR operations, whether at sea, in the air or on land.

The Cospas-Sarsat System provides distress alert and location to Rescue Coordination Centers (RCCs), for 406 MHz (and 121.5 MHz until 2009) radio beacons activated anywhere in the world. A detailed description of the Cospas-Sarsat System is provided in the document entitled "Introduction to the Cospas-Sarsat System, C/S G.003"—http://cospas-sarsat.org/Document/gDocs.htm.

Operational use of Cospas-Sarsat by SAR agencies started with the crash of a light aircraft in Canada, in which three people were rescued (Sep. 10, 1982). Since then, the System has been used for thousands of SAR events and has been instrumental in the rescue of over 20,000 lives worldwide.

The Cospas-Sarsat system is composed of:
- Radio beacons which transmit distress or security alert signals
- Instruments onboard satellites which detect the signals transmitted by distress radio beacons
- Ground receiving stations, referred to as Local Users Terminals (LUTs), which receive and process the satellite downlink signal to generate distress alerts
- Mission Control Centers (MCCs) which receive alerts produced by LUTs and forward them to Rescue Coordination Centers (RCCs), Search and Rescue Points Of Contacts (SPOCs) or other MCCs.

Cospas-Sarsat provides alerting services for the following types of beacons:
- Emergency Locator Transmitters (ELTs) for aviation use
- Emergency Position-Indicating Radio Beacons (EPIRBs) for maritime use
- Personal Locator Beacons (PLBs) for applications which are neither aviation nor maritime The Cospas-Sarsat satellite constellation is comprises of:
- Low Earth Orbit (LOE) satellites
- Geostationary (GEO) satellites
- Medium Earth Orbit (MEO) satellites—in the near future—Galileo and GPS satellites will augment Cospas-Sarsat in order to provide a continuous, worldwide service. Galileo satellites will also provide a downlink signal to acknowledge the alarm transmission.

Cospas-Sarsat determines the radio beacon's position either by measurement of RF Doppler shift (not applicable to GEOs) or by decoding the position data embedded in the beacon's message, in case that a navigation receiver (GPS, GLONASS, Galileo or similar) is comprised in the radio beacon.

Many radio beacons transmit, in addition to the standard 5 W 406 MHz alarm signal, an ancillary homing signal. This homing signal is usually low power (50-100 mW) and transmitted at 121.5 MHz or 243 MHz, which are aircraft emergency frequencies, reserved for emergency communications for aircraft in distress. 121.5 MHz is for civilian use, also known as International Air Distress (IAD) and 243 MHz is for military use, also known as Military Air Distress (MAD). Both are in use at the international level and are monitored by aircraft and ground stations worldwide.

Transmitting a 121.5 MHz homing signal would usually cause any aircraft flying nearby to render a siren sound on its radio speaker if set to the emergency channel.

When a SAR team approaches an activated radio beacon, it usually obtains the radio beacon's location information processed and delivered by Cospas-Sarsat. However, this information might not be updated due to communication problems from beacon to satellites or from shore stations to SAR team. Thus, homing signals can definitely assist SAR teams equipped with compatible Direction Finding (DF) devices.

However, determining direction and distance to such a homing signal has several drawbacks: a) direction and especially distance measurements are inaccurate; b) measurement is mostly sensitive to movements of the measuring device, almost impossible when done from a highly dynamic platform such as a vessel on high seas; c) operation range is limited due to the low transmission power of the homing signal; d) if a single 406 MHz antenna is used for the radio beacon, the homing RF signal might miss-match that antenna; e) a homing transmitter adds cost and weight and power consumption.

U.S. Pat. No. 6,992,623 and United States Patent Applications 20050073458 and 20040087284 to Street, suggest a 406 MHz emergency beacon with in-band homing transmitter, for example a 406 MHz homing transmitter (instead of 121.5 MHz). Since the beacon comprises also a standard 406 MHz satellite transmitter, the ancillary 406 MHz homing transmitter could share some electronic circuitry with the satellite transmitter and also enjoy good antenna matching. Still, other drawbacks of the current homing technique are not repaired.

U.S. Pat. Nos. 7,116,272 and 6,933,889 and United States Patent Application 20050270234 to Wolf et al disclose a system and method for a direction and distance finder for locating distress signals from a snow avalanche beacon. These inventions suggest a way to determine the distance to a distress radio beacon by measuring and analysing the beacon's RF path loss changes, in addition to RF direction finding. This method can be effective for very basic radio beacons and short distances, yet it obtains several drawbacks: direction measurement is done by manually pointing a device towards the radio beacon thus sensitive to movements and inaccurate; distance measurement requires advancing towards the beacon and is not accurate until significantly close to the radio beacon.

United States Patent Application 20060196499 to Cannizzaro discloses a scuba diver surface location, navigational and communication device and method. This invention, focused on positioning of divers on the water surface, is related to 2-D (two dimensions) positioning, i.e. distance and heading, and does not treat the 3-D problem, i.e. distance, direction (azimuth) and elevation (altitude). It is a local system for short range operation and does not deal with satellite communications. As such, it does not address specific issues related to satellite radio beacons. For example, in the Cospas-Sarsat system the entire 406-406.1 MHz band is divided into multiple narrowband discrete channels thus challenging a compatible receiver that should detect radio beacons transmitting spontaneously on different frequencies.

United States Patent Applications 20030003893 to Beni et al discloses a portable search and rescue system as quite known in the art. This system uses two ways (duplex or half duplex) portable radios embedded with GPS receivers and employs an interrogation protocol for location. It does not address satellite radio beacons which usually cannot be interrogated (since obtain an RF transmitter and no RF receiver), neither deals with other satellite radio beacon receiving issues such as the multiple Cospas-Sarsat channels.

Unfortunately, the standard 406 MHz radio beacon signal cannot be detected by standard aircraft receivers and it is neither on the maritime VHF band. Also, it is difficult to be tracked by regular DF devices since it is transmitted in bursts, about 0.5 seconds every 50 seconds. Yet, this signal could be very helpful as a homing signal for tracking radio beacons by SAR teams or vessels looking for a Man Over Board (MOB), for example, since it obtains high power and uses a very efficient radio frequency. Furthermore, this signal may contain very accurate location data which can yield to a fast and precise location of the radio beacon. As GPS and other navigation receivers get smaller and cheaper and power saver, manufacturers of emergency radio beacons embed such receivers in their products. A radio beacon integrated with a GPS receiver enables: a) precise location (meters instead of miles); b) compatibility with GEOs that can't perform Doppler measurements since don't move relatively to the earth.

Still, it is important to note that Cospas-Sarsat radio beacons operate on multiple discrete 3 KHz channels in the 406.0-406.1 MHz band. This spectrum is allocated by The International Telecommunication Union (ITU) for the dedicated use of low power satellite position-indicating radio beacons. Theoretically, a Cospas-Sarsat radio beacon can transmit on either one of the 33 (or 32) 3 KHz channels in this band, such as 406.022 MHz, 406.025 MHz, 406.028 MHz, etc'.

Practically, some frequencies in this band cannot be supported by the satellites' payloads; also Cospas-Sarsat regulates these channels according to capacity and load. Still, it would be desirable if a device designed to track satellite radio beacons would be able to detect all possible channels in the 406.0-406.1 MHz band. A wideband (100 KHz) receiver can do that however sensitivity would significantly be degraded as bandwidth gets wider so a narrower band receiver will probably achieve a longer detection range.

It is self evident that the time required to locate a distress and provide assistance has a direct impact on the probability of survival of the person in distress at sea or on land. According to Cospas-Sarsat, studies show that while the initial survivors of an aircraft crash have less than a 10% chance of survival if rescue is delayed beyond two days, the survival rate is over 60% if the rescue can be accomplished within eight hours. Similar urgency applies in maritime distress situations, particularly where injuries have occurred. Furthermore, accurate location of the distress can significantly reduce both SAR costs and the exposure of rescue forces to hazardous conditions, and clearly improve efficiency.

Therefore, it is quite clear that SAR operations could benefit from a device and method for precisely determining the direction and distance to a satellite radio beacon.

One particular example for the need of a device and method for precisely determining the direction and distance to a satellite radio beacon relates to Man Over Board (MOB) accidents. Thousands of persons are lost at sea every year due to MOB accidents. Detection and location of a person that falls from a vessel at sea is crucial since survival time in water is limited, typically 2-40 hours at 60-70° F. (16-21° C.) and 1-6 hours at 40-60° F. (4-16° C.). Mariners can carry satellite radio beacons such as small PLBs, possibly worn or inserted in a life vest, and alert Cospas-Sarsat upon a MOB event. However, in many cases, especially when MOB occurs far away offshore, the most and perhaps only reliable SAR can arrive from the very vessel from which MOB occurred. In such a case, a device for precisely determining the direction and distance to a satellite radio beacon which is attached to the MOB, such a device installed onboard, could be crucial.

The present art methods described above have not yet provided satisfactory solutions to the problem of precisely determining the direction and distance to a satellite radio beacon.

It is the object of the present invention to provide a device and method for precisely determining the direction and distance to a satellite radio beacon.

It is another object of the present invention to provide a device and method for precisely determining the direction and distance to a satellite radio beacon, by detecting and decoding the standard alarm message transmitted by radio beacons to Cospas-Sarsat satellites, in case that the message contains the radio beacon self position.

It is yet another object of this invention to provide a device and method for precisely determining the direction and distance to a satellite radio beacon, from relatively a long distance, by leveraging the high power and narrow bandwidth nature of the signal transmitted from radio beacons to satellites.

It is another object of this invention to provide a device and method for precisely determining the direction and distance to a satellite radio beacon, not sensitive to dynamic roll and pitch as often experienced on a vessel, by leveraging the Omni directional and digital nature of the signal and modulated information transmitted from radio beacons to satellites.

It is another object of this invention to provide a device and method for precisely determining the direction and distance to a satellite radio beacon, with minimal additional requirement from the radio beacon on weight, volume, power consumption and cost beyond what is required for precisely locating it by Cospas-Sarsat satellites.

It is yet another object of this invention to provide a device and method for precisely determining the direction and distance to a satellite radio beacon transmitting on any discrete channel in the allocated band.

SUMMARY OF INVENTION

The present invention discloses a device and method for precisely determining the direction and distance to a satellite radio beacon, comprised of:

a) A first receiver configured to receive radio beacon signals;

b) A second receiver configured to receive navigation signals from a positioning system;

c) A microcontroller;

d) An output device;

whereby said device is configured to scan preset radio channels, detect a signal transmitted by a radio beacon to satellites on one of said channels, decode the message modulated in said signal indicating said radio beacon's position, determine self position by means of said navigation receiver, calculate the direction and distance from said device to said radio beacon by means of said microcontroller and indicate said direction and distance on said output device.

In a preferred embodiment, said satellite radio beacon is part of the Cospas-Sarsat system, either an EPIRB or ELT or PLB or SSAS beacon, with a built in GPS receiver (in this document, it might be also referred to as a "beacon" or "radio beacon" or "satellite radio beacon" or "distress radio beacon" or similarly).

In this preferred embodiment, said first receiver RF band is 406-406.1 MHz (in this document it might be also referred to as "406 MHz"), said navigation receiver is GPS compatible (in this document it might be also referred to as "GPS"). In this embodiment said output device is a Liquid Crystal Display (LCD) in addition to a high volume buzzer.

In the preferred embodiment, the disclosed device operates in either one of two modes: scanning or active (receiving), which are set and configured by the micro controller.

Scanning is the default mode. In this mode, the receiver continuously scans the 100 KHz band between 406 MHz and 406.1 MHz, hopping from channel to channel at 3 KHz steps (or wider) until it detects an active channel. On each channel the receiver stays for a preset period of time, about 5-10 milliseconds, unless activity is detected.

Upon detecting a valid activity on a scanned channel, the receiver switches to the active mode. In this mode, the receiver stays on one channel and the micro controller tries to decode the receiver's output data and analyze it according to Cospas-Sarsat protocols. Once a valid alarm message is detected, the microcontroller outputs a proper alarm signal. In the preferred embodiment, it buzzes and displays a proper alarm message.

The microcontroller parses the radio beacon's message, particularly decoding the beacon's position coordinates inserted in the message. The microcontroller also acquires self position from the built in GPS receiver. Using those two sets of coordinates, the microcontroller calculates the direction and distance from the measuring device to the radio beacon. These results are displayed on the output device and continuously been updated. In addition to direction and distance, the device can display the radio beacon's identity, its absolute position and other relevant data.

Switching back from active to scanning mode is triggered either by: a) an input from the operator or an external device; or b) a preconfigured time out of no activity on this channel.

Other objects and advantages of the invention will become apparent as the description proceeds.

BRIEF DESCRIPTION OF DRAWINGS

The above and other characteristics and advantages of the invention will be better understood through the following illustrative and non-limitative detailed description of preferred embodiments thereof, with reference to the appended drawings, wherein.

The figure shows: a) three GPS satellite; b) one Cospas-Sarsat satellite; c) a satellite radio beacon; and d) the disclosed device.

Both the satellite radio beacon and the disclosed device obtain two antennas each: a GPS antenna (L band) configured to receive GPS satellites signals and a UHF (406 MHz) antenna, used by the radio beacon to transmit alarm signals to Cospas-Sarsat satellites and used by the disclosed device to receive said radio beacon alarm signals. For positioning purposes, signals from at least three GPS satellites should be simultaneously received (if the altitude is known as on sea level) but four satellites guarantee a position fix in any case and more in-view satellites can refine accuracy. For alarm communication purposes, one Cospas-Sarsat is sufficient and since said radio beacon comprises a GPS receiver and modulates its self position on the alarm message, any Cospas-Sarsat satellite (LEO, GEO and in the future also MEO) can be used.

The figure shows four main blocks: a) a UHF (406 MHz) receiver including antenna; b) a navigation (GPS) receiver including antenna; c) a microcontroller; and d) an output device (display/speaker). The microcontroller obtains an Input/Output interface for external connectivity. All said four blocks can be implemented by components well known in the art.

In this figure, planet earth is assumed to be a sphere; the disclosed device and the satellite radio beacon are assumed to be on the surface of this sphere.

Specific points are marked.

O—Earth planet center

P—the North Pole

A—the disclosed device location

B—the satellite radio beacon location

The spherical triangle PAB is the basis for precisely determining the direction and distance from the disclosed device to the satellite radio beacon. Solving this triangle provides the distance d (arc AB) and the direction (azimuth=true bearing from north) angle $\alpha$ (angle PAB) between said locations.

DETAILED DESCRIPTION

The present invention discloses a device and method for precisely determining the direction and distance to a satellite radio beacon, comprised of:

a) A first receiver configured to receive radio beacon signals;

b) A second receiver configured to receive navigation signals from a positioning system;

c) A microcontroller;

d) An output device;

whereby said device is configured to scan preset radio channels, detect a signal transmitted by a radio beacon to satellites on one of said channels, decode the message modulated in said signal indicating said radio beacon's position, determine self position by means of said navigation receiver, calculate the direction and distance from said device to said radio beacon by means of said microcontroller and indicate said direction and distance on said output device.

Figure 1:
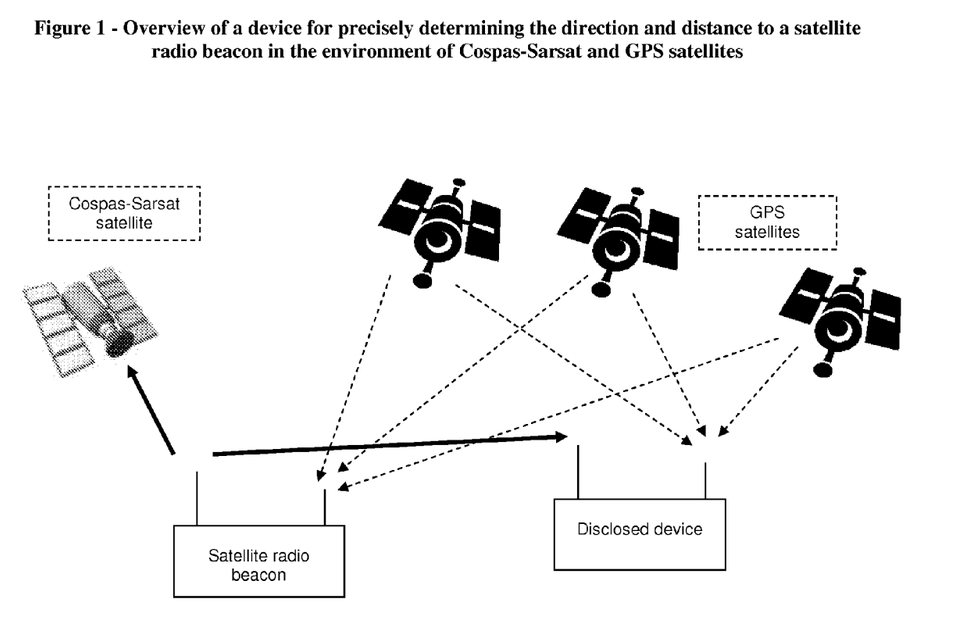
FIG. 1 is an overview of a device for precisely determining the direction and distance to a satellite radio beacon, in the environment of Cospas-Sarsat and GPS satellites.

FIG. 1 is an overview of a device for precisely determining the direction and distance to a satellite radio beacon, in the environment of Cospas-Sarsat and GPS satellites.

Figure 2:
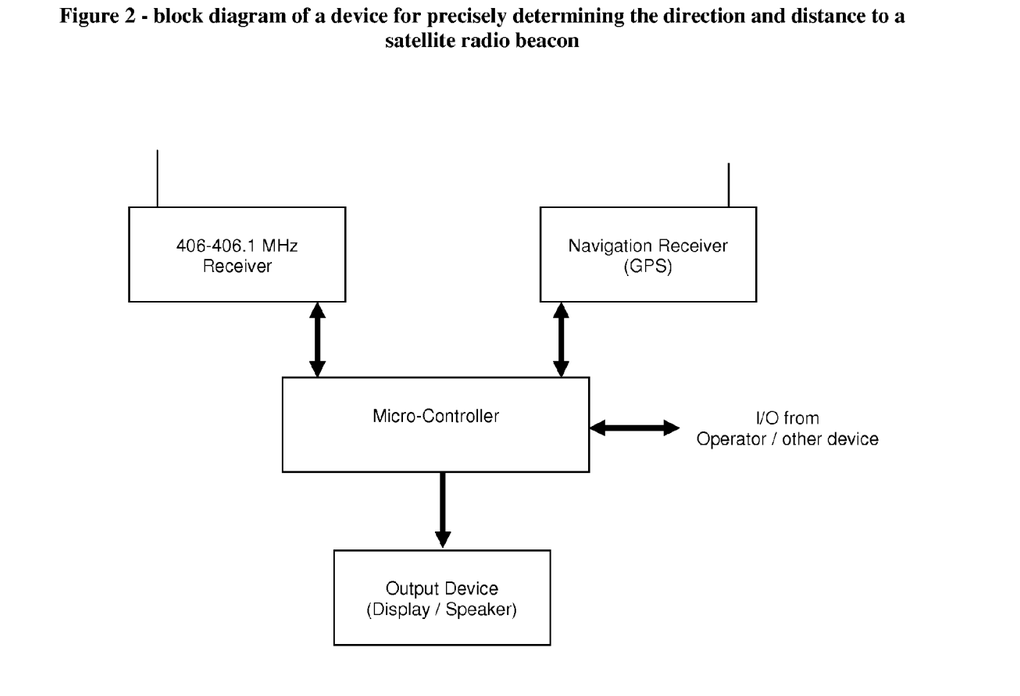
FIG. 2 is a block diagram of a device for precisely determining the direction and distance to a satellite radio beacon.

FIG. 2 is a block diagram of a device for precisely determining the direction and distance to a satellite radio beacon, according to a preferred embodiment.

The figure shows four main blocks: a) a UHF (406 MHz) first receiver including antenna; b) a navigation (GPS) second receiver including antenna; c) a microcontroller; and d) an output device.

In the preferred embodiment, said first receiver is a narrowband UHF receiver tunable over the 406-406.1 MHz band to any center frequency at 1 KHz resolution. A PSK demodulator is linked to or part of the receiver, which output data and clock are linked to the microcontroller. The microcontroller can set the receiver's center frequency by configuring its synthesizer. Such receivers and demodulators are well known in the art.

In this preferred embodiment, the navigation receiver (said second receiver) is based on u-blox UBX-G5010 GPS single chip. For a data sheet see—http://www.u-blox.com/products/ubx-g5010.html In this preferred embodiment, the microcontroller is based on IT MSP430 single chip microcontroller. For a brochure see—http://focus.ti.com/lit/ml/slab0341/slab0341.pdf In this embodiment said output device is a Liquid Crystal Display (LCD) in addition to a high volume buzzer or speaker, components well known in the art.

The technical specifications that define the Cospas-Sarsat radio beacon, including RF characteristics, modulation and message format, are detailed in the following document:

SPECIFICATION FOR

COSPAS-SARSAT

406 MHz DISTRESS BEACONS

C/S T.001

Issue 3—Revision 7

November 2005

Which can be found at—http://www.cospas-sarsat.org/DocumentsTSeries/T1Nov05.pdf

In the preferred embodiment, the disclosed device operates in either one of two modes: scanning or active (receiving), which are set and configured by the micro controller.

Scanning is the default mode. In this mode, the receiver continuously scans the 100 KHz band between 406.0 MHz and 406.1 MHz, hopping from channel to channel at 3 KHz steps, until it detects an active channel, 3 KHz was selected as step size since it is the nominal Cospas-Sarsat radio beacon bandwidth, yet this hop step can be set wider if the 406 MHz receiver obtains a wider bandwidth and is sensitive enough to achieve the desired detection range. On each channel the receiver stays for a preset period of time, unless an activity is detected. This time is preconfigured considering the Cospas-Sarsat alarm message duration, the number of channels to scan and the 406 MHz receiver hop speed. A channel scanning time of 5-10 milliseconds is reasonable since the Cospas-Sarsat alarm message duration is 440/520 ms; there are maximum 33 channels to scan (practically less) and the synthesizer and PLL settling time of the 406 MHz receiver according to the preferred embodiment is less than 100 micro seconds. If a wider bandwidth receiver is selected and accordingly a wider scanning hop, then a longer channel scanning time can be set. For reference, Cospas-Sarsat satellites employ receivers with 27-80 KHz bandwidth to receive same radio beacons.

Upon detecting a valid activity (e.g. energy level beyond a predefined threshold; bit transitions at 400 bps; frame synchronization pattern) on a scanned channel, the receiver switches to the active mode. In this mode, the receiver stays on the active channel and the micro controller tries to decode the receiver's output data and analyze it according to Cospas-Sarsat protocols. Once a valid alarm message is detected, the microcontroller outputs a proper alarm signal. In the preferred embodiment, it buzzes and displays a proper alarm message.

The microcontroller parses the radio beacon's message, particularly decoding the beacon's position coordinates inserted in the message. The microcontroller also acquires self position from the built in GPS receiver, yet the current invention is not restricted to a specific positioning system and may employ GPS, GLONASS, Galileo, LORAN, OMEGA, ARGOS or similar systems. Using those two sets of coordinates, the microcontroller calculates the direction and distance from the measuring device to the radio beacon.

The determined direction and distance are displayed on the output device and continuously been updated. In addition, the device can display the radio beacon's identity, its absolute position and other relevant data. The output device may be either audible or visible or both, such as a speaker, horn, buzzer, LCD display, LED display, bar graph, hand, pointer, bubble.

The direction and distance to the radio beacon are indicated either in absolute terms (e.g.: azimuth=x degrees; elevation=y degrees; distance=z miles) or relatively (e.g.: leftward; downward; higher sound when closer or better pointed to the radio beacon) or both ways.

It is important that position coordinates of both locations would be measured according to the same geodetic reference grid system. Such a common and standard grid is WGS-84 (World Geodetic System 1984) which is a standard recommended by Cospas-Sarsat and also supported by most GPS receivers. If the position coordinates are not according to the same geodetic system, a mathematical conversion from one geodetic system to another can be performed, as well known in the art.

There are various approaches and ways for determining the distance and direction between two points that are in close proximity to the surface of the globe. Typically, the determined distance and direction should express the shortest way to get from one point to the other yet this is not necessarily a straight line. A helicopter that flies 3000 feet above sea level and 10 miles away from a radio beacon floating on the sea, for example, can use a straight line to approach the beacon; however a vessel that sails towards a radio beacon floating 100 miles away should follow a great circle path which is the shortest way on a sphere between two points; a four wheel drive vehicle on a SAR mission should naturally consider topography and further obstructions driving towards the radio beacon. For these purposes, state of the art Geographic Information Systems (GIS) and related data bases provide a quite reliable model of the earth planet surface and can be used in conjunction with the current invention. The disclosed device may well be integrated with a GPS device for marine or airborne or terrestrial use that already obtains an accordingly suitable geographic data base.

Even neglecting topography, the geoid (mean ocean surface of planet earth) is a complex three dimensional body. In first proximity, the mathematical model for the geoid is a sphere (~6371 Km radius) and in second proximity it is an ellipsoid (~6357 Km polar radius/6378 Km equatorial radius for WGS-84). The ellipsoidal model, particularly the WGS-84 datum, is regularly used for mapping and geodesy. For maritime navigation the spherical model is widely used. The error in distance calculated according to the spherical model, referred to the ellipsoidal model, is less than 1%, negligible for the purposes of the current invention.

In the preferred embodiment, direction and distance determination is done considering a spherical earth planet model and assuming that both points are roughly on the sphere surface (e.g. ship rescues MOB).

Figure 3:
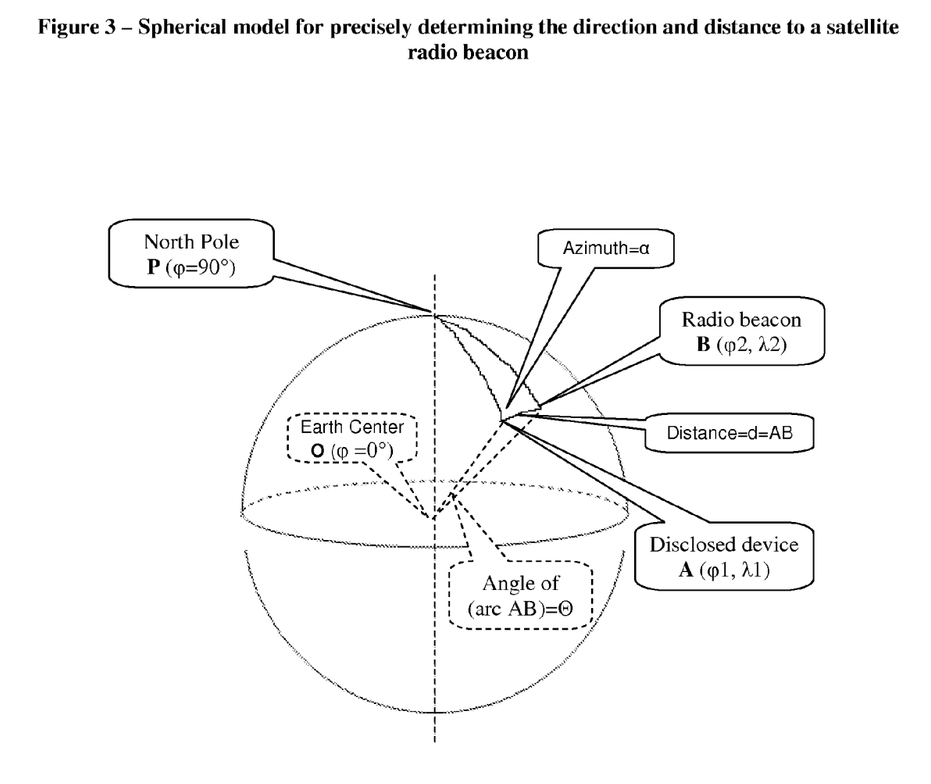
FIG. 3 shows a Spherical trigonometric model for precisely determining the direction and distance to a satellite radio beacon.

Direction and distance from the disclosed device to the satellite radio beacon are calculated as following (see FIG. 3).

Assuming:
Sphere earth planet model with mean radius R
Earth planet center is marked O
The North Pole is marked P
The disclosed device location is A (LAT=$\phi 1$; LON=$\lambda 1$, ALT=z1; z1<<R)
The radio beacon location is B (LAT=$\phi 2$; LON=$\lambda 2$, ALT=z2; z2<<R)
Degrees are in radians unless stated otherwise Then, the spherical triangle PAB is the basis for precisely determining the direction and distance from the disclosed device to the satellite radio beacon. Solving this triangle provides the distance d (arc AB) and the direction (azimuth=true bearing from north) angle $\alpha$ (angle PAB) between said locations.

Solving the Distance (Arc d=AB):
From FIG. 3, it is clear that OA=OB=R; Then, it is possible to determine two arcs (PA and PB) and the angle between them (angle APB) in the spherical triangle PAB:
Arc PA, part of the meridian $\lambda 1$, has an angular distance of (90°−$\phi 1$); thus PA=R (90°−$\phi 1$);
Arc PB, part of the meridian $\lambda 2$, has an angular distance of (90°−$\phi 2$); thus PB=R (90°−$\phi 2$);
Arc AB, the distance d to be determined, has the unknown angular distance $\Theta$; thus d=R $\Theta$;
Angle APB is the angle between the meridians $\lambda 1$ and $\lambda 2$; thus angle APB=($\lambda 2$−$\lambda 1$);
Applying the law of cosines to the spherical triangle PAB and substituting cos (90°−$\phi$)=sin $\phi$ and sin (90°−$\phi$)=cos $\phi$ provides:
(E-1) The distance between receiver and transmitter is d=R $\Theta$; where $$\cos \Theta = \sin \phi 1 \sin \phi 2 + \cos \phi 1 \cos \phi 2 \cos(\lambda 2 - \lambda 1);$$

Equation E-1 is mathematically exact however computing the inverse cos for small angles might lead to large rounding errors thus it is preferable to substitute $(1-\cos \Theta)=2 \sin^2 (\Theta/2)$ and obtain:
(E-2) The distance between receiver and transmitter is d=R $\Theta$; where $$\sin^2(\Theta/2) = \sin^2[(\phi 2 - \phi 1)/2] + \cos \phi 1 \cos \phi 2 \sin^2 [(\lambda 2 - \lambda 1)/2]; \text{ a.k.a the Haversine formula.}$$

Solving the Direction (Angle $\alpha$ Between the Meridian $\lambda 1$ and Arc AB=d):
As determined previously: PB=R (90°−$\phi 2$) and d=R $\Theta$;
Applying the law of sines to the spherical triangle PAB provides:
(E-3) The direction (azimuth=true north bearing) between receiver and transmitter is $\alpha$; where $$\sin \alpha = \cos \phi 2 \sin(\lambda 2 - \lambda 1)/\sin \Theta$$

(E-4) The elevation angle $\beta$ from the receiver to the transmitter is:

$$\tan \beta = (z2 - z1)/d$$

Practically, it is expected that activated distress radio beacons will usually lay on the ground or float on the sea, so their LAT and LON will uniquely define their position.

Particular Cases of E-1, E-2 and E-3:
a) If the two points are on the same longitude ($\lambda 1 = \lambda 2 = \lambda$) then, $$\Theta = \phi 1 - \phi 2 (\text{or } \Theta = \phi 2 - \phi 1); \text{ so}$$

d=R ($\phi 2 - \phi 1$); i.e. d is the arc on the meridian $\lambda$ from latitude $\phi 1$ to latitude $\phi 2$; and
sin $\alpha$=0; so
azimuth=0° (northward); if $\phi 1 < \phi 2$; and
azimuth=180° (southward); if $\phi 1 > \phi 2$
If also, for example, ($\phi 1 - \phi 2$)=1°=~1/57 radian, then d=~R/57=~112 Km=~60 NM (Nautical Miles)

b) If the two points are on the equator ($\phi 1 = \phi 2 = 0$) then, $$\Theta = \lambda 2 - \lambda 1 (\text{or } \Theta = \lambda 1 - \lambda 2); \text{ so}$$

d=R ($\lambda 2 - \lambda 1$); i.e. d is the arc on the equator from longitude $\lambda 1$ to longitude $\lambda 2$; and
sin $\alpha$=sin($\lambda 2 - \lambda 1$)/sin $\Theta$=+/−1; so
azimuth=90° (eastward); if $\lambda 1 < \lambda 2$; and
azimuth=270° (westward) if $\lambda 1 > \lambda 2$
If also, for example, ($\lambda 2 - \lambda 1$)=0.5°=~0.5/57) radian, then d=~R/114=~56 Km=~30 NM References:
1) AMERICAN PRACTICAL NAVIGATOR
Originally by Nathaniel Bowditch
Published by The
Defense Mapping Agency Hydrographic Center
Department of Defense
2) http://en.wikipedia.org/wiki/Great-circle distance
3) http://en.wikipedia.org/wiki/Spherical_trigonometry
4) http://mathworld.wolfram.com/SphericalTrigonometry.html Switching back from active to scanning mode is triggered either by: a) an input from the operator or an external device; or b) a preconfigured time out of no activity on this channel. As Cospas-Sarsat radio beacons transmit a burst of 440/520 ms every 50 seconds, a reasonable time out would be 5-20 minutes. When a SAR activity is concerned with a single radio beacon, it is expected that the disclosed device would stay in active mode until mission is accomplished. For SAR of multiple radio beacons (e.g. a big ship wrecks and several EPIRBs or PLBs are activated), the operator is able to manually select modes in order to search for other radio beacons. It is also possible to command the receiver to ignore or search for specific radio beacons (e.g. neglect a specific beacon that is been taken care by another SAR team), or ignore or scan specific channels (e.g. search for a sub group of channels when it is known that other channels in the 406 MHz band are not in use).

Possibly, the disclosed device may additionally comprise a transmitter configured to acknowledge the radio beacon's alarm message.

According to one aspect of the invention, the presently disclosed device is installed in a coast guard ship, launched to rescue a crew from a wrecked ship that activated an EPIRB. The coast guard ship navigates to the location reported by Cospas-Sarsat, and as it approaches that site, the disclosed device detects the EPIRB signals and displays the precise direction and distance to the EPIRB, in terms of azimuth (direction) and range (distance). The device also displays the serial number of the EPIRB (MMSI—Maritime Mobile Service Identity, or radio call sign, etc') so the coast guard crew can verify the identity of that radio beacon. The displayed data is constantly been updated, and the coast guard ship is steered according to the displayed azimuth, while the displayed distance decreases accordingly, until hopefully, the survivors are located and rescued.

According to another aspect of the invention, the disclosed device is installed in a ship making its way in the ocean. The mariners onboard wear a miniature PLB for security reasons. Once a man (person) falls overboard (MOB), his/her PLB starts transmitting alarm messages to Cospas-Sarsat satellites. The device installed onboard immediately detects these signals, displays and sounds a proper alert, and determining the direction and distance to this satellite radio beacon it guides the ship crew back towards the person that fell overboard.

According to another aspect of the invention, the presently disclosed device is installed in a SAR helicopter, launched to search and rescue aircraft accident survivors, as the accident automatically activated the aircraft ELT. The SAR team navigates to the location reported by Cospas-Sarsat, and as it approaches that site, the disclosed device detects the ELT signals and displays the precise direction and distance to the ELT, in terms of azimuth and elevation (direction) and range (distance). The device also displays the serial number of the ELT (aircraft address, aircraft operator designator, etc') so the SAR team can verify the identity of that radio beacon.

According to another aspect of the invention, the presently disclosed device is installed in an airplane, launched to inspect a ship that activated a SSAS beacon. As the plane approaches the ship, the disclosed device detects the SSAS beacon signals and displays the precise direction and distance to it, in addition to the ship's MMSI. The plane can then better report of the observed situation there.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention. In this context, though the invention specifically refers to the Cospas-Sarsat system, it is definitely not bounded to this particular system, and its scope is well beyond any specific satellite communication or navigation system or any specific radio beacon type or system.

The invention claimed is:

1. A device for precisely determining the direction and distance to a radio beacon, comprised of:
   a) A first receiver configured to receive said radio beacon signals;
   b) A second receiver configured to receive navigation signals from a positioning system;
   c) A microcontroller;
   d) An output device;
   said radio beacon configured to transmit repetitive short messages, said messages having a predefined transmission time and each message transmitted on one of a predefined set of transmission channels, wherein said device is configured to consecutively and cyclically scan said transmission channels, tuning said first receiver to each one of said transmission channels for a period of time not longer than said predefined transmission time divided by the number of said predefined transmission channels, detect a signal transmitted by a radio beacon on one of said channels, decode the message modulated in said signal indicating said radio beacon's position, determine self position by means of said second receiver, calculate the direction and distance from said device to said radio beacon by means of said microcontroller and indicate said direction and distance on said output device.

2. A device according to claim 1, wherein said beacon is configured to transmit signals to satellites orbiting around the globe.

3. A device according to claim 1, wherein said device is configured to scan said predefined transmission channels to detect at least one of: energy level beyond a predefined threshold; bit transitions at a predefined rate; frame synchronization pattern(s).

4. A device according to claim 1, configured to receive signals from a radio beacon which is part of the Cospas-Sarsat system, either one of the following types:
   a) An Emergency Position Indicating Radio Beacon (EPIRB) for maritime use; or
   b) An Emergency Locator Transmitter (ELT) for aviation use; or
   c) A Personal Locator Beacon (PLB) for terrestrial use; or
   d) A Ship Security Alert System (SSAS) beacon.

5. A device according to claim 1, wherein said first receiver is configured to receive radio beacon signals at a radio frequency of 406-406.1 MHz.

6. A device according to claim 1, wherein said second receiver is configured to receive signals and calculate self position according to at least one of the following positioning systems: GPS, GLONASS, Galileo, LORAN, OMEGA, ARGOS.

7. A device according to claim 1, wherein said radio beacon is attached to a person onboard a vessel and said device is installed onboard said vessel, and when said person falls overboard and said radio beacon is activated, said device is configured to determine and indicate the direction and distance to said person overboard.

8. A device according to claim 1, wherein said output is either audible or visible or both, and said output device is selected from the following group: speaker; horn; buzzer; LCD display; LED display; bar graph; hand; pointer; bubble.

9. A device according to claim 1, wherein the direction and distance to the radio beacon are indicated in either one or a combination of the following methods: a) absolute terms, such as degrees or miles; b) relatively, such as left/right/up/down, or closer.

10. A device according to claim 1, wherein said device is integrated with a GPS device for marine or airborne or terrestrial use, and wherein said first receiver is mounted with an internal or an external antenna.

11. A device according to claim 1, wherein the distance and direction between said device location and said radio beacon location is determined according to at least one of the following methods:

a) A straight line connecting between said locations;
b) The shortest line on the surface of a sphere (great circle) connecting between said locations;
c) The shortest line on the geoid (mean ocean surface of planet earth) connecting between said locations;
d) A non direct line configured to bypass topographic or other known obstacles on the way connecting between said locations.

12. A device according to claim 1, wherein said device is configured to scan only a part of said predefined transmission channels, by defining a list of channels to scan or a list of channels to ignore.

13. A device according to claim 1, wherein said device is configured to search for or ignore specific radio beacons, by defining a list of specifically identified radio beacons to search for or a list of specifically identified radio beacons to ignore.

14. A device according to claim 1, wherein said device further comprises a transmitter configured to acknowledge said radio beacon's transmission.

15. A method for precisely determining the direction and distance to a satellite radio beacon configured to transmit repetitive short messages to satellites orbiting around the globe, said messages having a predefined transmission time and each message transmitted on one of a predefined set of transmission channels, comprising the steps of:

a) Determining said beacon's predefined transmission time;
b) Determining said beacon's predefined transmission channels;
c) Providing a device comprising:
  i) a first receiver configured to receive said radio beacon signals;
  ii) a second receiver configured to receive navigation signals from a positioning system;
  iii) a microcontroller;
  iv) an output device;
d) Scanning at said device, consecutively and cyclically, said predefined transmission channels, tuning said first receiver to each of said predefined transmission channels for a time period not longer than said beacon's predefined transmission time divided by the number of said predefined transmission channels;
e) Detecting at said device a signal transmitted by said radio beacon on one of said channels;
f) Decoding at said device the message modulated in said signal indicating said radio beacon's position;
g) Determining said device self position by means of said second receiver;
h) Calculating the direction and distance from said device to said radio beacon by means of said microcontroller;
i) Indicating said direction and distance on said output device.

* * * * *